United States Patent
Dou et al.

(10) Patent No.: US 11,036,736 B2
(45) Date of Patent: Jun. 15, 2021

(54) OPTIMIZING ACCESS PLAN FOR QUERIES WITH A NESTED LOOP JOIN

(71) Applicant: International Business Machines Corporation, Armonk, NY (US)

(72) Inventors: Zhi Tong Dou, Beijing (CN); Yue Li, Beijing (CN); Guang Bao N. Ni, Beijing (CN); Gang Shen, Shanghai (CN); Jing Jing Xiao, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 15/465,699

(22) Filed: Mar. 22, 2017

(65) Prior Publication Data

US 2018/0276275 A1    Sep. 27, 2018

(51) Int. Cl.
*G06F 15/16*      (2006.01)
*G06F 16/2453*   (2019.01)
*G06F 16/28*      (2019.01)

(52) U.S. Cl.
CPC ...... *G06F 16/24544* (2019.01); *G06F 16/284* (2019.01)

(58) Field of Classification Search
CPC combination set(s) only.
See application file for complete search history.

(56) References Cited

U.S. PATENT DOCUMENTS

| | | | |
|---|---|---|---|
| 6,493,701 B2 | 12/2002 | Ponnekanti | |
| 6,763,359 B2 | 7/2004 | Lohman et al. | |
| 7,565,342 B2 | 7/2009 | Fuh et al. | |
| 7,716,215 B2 | 5/2010 | Lohman et al. | |
| 7,774,336 B2 | 8/2010 | Beyer et al. | |
| 7,945,562 B2 | 5/2011 | Ahmed et al. | |
| 2006/0026133 A1 | 2/2006 | Ahmed | |
| 2007/0219951 A1* | 9/2007 | Ahmed | G06F 16/24544 |
| 2008/0147593 A1 | 6/2008 | Ramesh et al. | |
| 2012/0191698 A1* | 7/2012 | Albrecht | G06F 16/2453 707/718 |
| 2013/0054567 A1 | 2/2013 | Graefe | |

(Continued)

OTHER PUBLICATIONS

Navin Kabra, David J. Dewitt, "Efficient Mid-Query Re-Optimization of Sub-Optimal Query Execution Plans" (Year: 1998).*

(Continued)

*Primary Examiner* — Alex Gofman

(74) *Attorney, Agent, or Firm* — Richard Wilhelm; Edell, Shapiro & Finnan, LLC

(57) ABSTRACT

A method, computing system and computer program product are provided. A nested loop join access plan for a query is executed and processed records of a most outer table of a nested loop join that satisfy local predicates are counted. When a count of the processed records is not less than a threshold value, a cost to complete execution of the nested loop join access plan and a cost of executing a new access plan based on recalculated filter factors for local predicates of the query are compared. When the cost to complete is less, execution of the nested loop join access plan is resumed to complete running of the query. When the cost of executing the new access plan is less, the new access plan is executed to rerun the query. A result of the query is provided.

12 Claims, 4 Drawing Sheets

(56) References Cited

U.S. PATENT DOCUMENTS

2014/0095472 A1* 4/2014 Lee .................. G06F 16/24542
707/714
2015/0363466 A1* 12/2015 Balmin ............. G06F 16/24544
707/714
2016/0350375 A1* 12/2016 Das .................. G06F 16/24542

OTHER PUBLICATIONS

Liu et al., "Research on the Query Performance Optimization Based on the DB2 UDB", International Conference on Network and Finance Development, NFD 2010, Scientific Research, 2010, pp. 185-188.
Kabra et al., "Efficient Mid-Query Re-Optimization of Sub-Optimal Query Execution Plans", SIGMOD '98, ACM 1998, pp. 106-117.

* cited by examiner

OPTIMIZING ACCESS PLAN FOR QUERIES WITH A NESTED LOOP JOIN

BACKGROUND

Present invention embodiments are related to systems, methods and computer program products for optimizing an access plan for a query in a relational database management system. In particular, the present invention embodiments relate to optimizing an access plan for a query that includes a nested loop join (NLJN) in a relational database management system.

A JOIN operation among tables is common in relational database management systems for both OnLine Transactional Processing (OLTP) and OnLine Analytical Processing (OLAP) scenarios. In a simple SQL query, in an OLTP context, a Nested Loop JOIN (NLJN) and an INDEX SCAN are usually optimal. However, for complicated queries in an OLAP context, a Hash JOIN (HSJN) or a Merge-sorted JOIN (MSJN) is much more efficient than a NLJN operation. Often, a complicated query in an OLAP environment fails to return a result even after executing all night long. This is caused by a query optimizer choosing a suboptimal NLJN.

Query optimizers for use with a relational database management system in an OLAP scenario including, but are not limited to, Netezza® (a registered trademark of IBM INTERNATIONAL GROUP BV LIMITED LIABILITY COMPANY NETHERLANDS), Greenplum® (a registered trademark of PIVOTAL SOFTWARE, INC. of San Francisco, Calif.) and DB2 LUW BLU from International Business Machines Corporation, preferably choose a HSJN operation for a complicated query. Unfortunately, a query optimizer may choose a wrong operation due to an error in evaluating filter factors of local or JOIN predicates. For example, for a SQL query such as
select . . .
from ACCOUNT a, EVENT e
where substr (a.status, 3, 1)='0' and substr (a.status, 4, 1)='0'
and e.txn_date between '2015-01-01' and '2015-12-31'
and a.account_number=e.account_number
group by . . .
A query optimizer may calculate a filter factor for both local predicates of ACCOUNT table, substr (a.status, 3, 1)='0' and substr (a.status, 4, 1)='0', as 0.04 by default when, in fact, the filter factor may be more than 0.99 for both of the local predicates. As a result, the query optimizer may choose a more expensive NLJN operation instead of a more efficient HSJN operation.

Three options have been presented for addressing the above-mentioned scenario. Option 1 involves providing manual hints to control which join method a query optimizer should choose in a particular context. Option 2 includes facilitating better cardinality estimation by using, for example, a SELECTIVITY clause in a DB2 database management system. Option 3 includes pre-building accurate statistics for filter factors by using STATISTICAL VIEW in DB2 LUW.

Option 1 requires developers or database administrators of the query optimizer to understand a distribution of data. Using this option, much effort by the developers and the database administrator is involved for tuning complex queries. Further, too many ad hoc queries are often generated, which are more than can be handled by human intervention.

Option 2 is specific to several known patterns of queries, which use a SELECTIVITY clause to define a filter factor. However, much more query optimization expertise is required for option 2 to work effectively and option 2 is not very effective when there are a large number of ad hoc queries.

Option 3 does not work for ad hoc queries. Further, building a large amount of statistics for a statistical view of various business scenarios is impractical. Even when a statistical view is used, option 3 does not work well when a minor change is made to predicates of a query.

SUMMARY

In a first aspect of the invention, a machine-implemented method is provided to optimize an access plan which includes a nested loop join for a query in a relational database management system. A computing system executes a nested loop join access plan that is selected by a query optimizer for a query. While executing the nested loop join access plan, a number of records processed from records of a most outer table of the nested loop join that satisfy local predicates of the most outer table are counted. When the number of records processed from the most outer table is not less than a threshold value, comparing a cost to complete execution of the nested loop join access plan with a cost of executing a new access plan based on recalculated filter factors for local predicates of the query. When the cost of executing the new access plan is less than the cost to complete execution of the nested loop join access plan, the new access plan is executed while rerunning the query. A result of the query is then provided.

In a second aspect of the invention, a system is provided to optimize an access plan, which includes a nested loop join, for a query in a relational database management system. The system includes at least one processor and at least one memory connected with the at least one processor. The at least one processor is configured to: execute a nested loop join access plan selected by a query optimizer for a query such that a number of records processed from records of a most outer table of the nested loop join that satisfy local predicates of the most outer table are counted. When the number of records processed from the most outer table is not less than a threshold value, the at least one processor is configured to: compare a cost to complete execution of the nested loop join access plan with a cost of executing a new access plan based on recalculated filter factors for local predicates of the query. When the cost to complete is less than the cost of executing the new access plan, the at least one processor is further configured to resume execution of the nested loop join access plan to complete running of the query. When the cost of executing the new access plan is less than the cost to complete execution of the nested loop join access plan, the at least one processor is configured to execute the new access plan while rerunning the query. The at least one processor is then configured to provide a result of the query.

In a third aspect of the invention, a computer program product is provided. The computer program product includes at least one computer readable storage medium having computer readable program code embodied therewith for execution on at least one processor. The computer readable program code is configured to be executed by the at least one processor to execute a nested loop join access plan selected by a query optimizer for a query such that a number of records processed from records of a most outer table of the nested loop join that satisfy local predicates of the most outer table is counted. When the number of records processed from the most outer table is not less than a threshold value, the computer readable program code is configured to be executed by the at least one processor to compare a cost to complete execution of the nested loop join access plan with a cost of executing the new access plan based on recalculated filter factors for local predicates of the query. When the cost to complete is less than the cost of executing the new access plan, the computer readable program code is configured to be executed by the at least one processor to resume execution of the nested loop join access plan to complete running of the query. When the cost of executing the new access plan is less than the cost to complete execution of the nested loop access plan, the computer readable program code is configured to be executed by the at least one processor to execute the new access plan while rerunning the query. The computer readable program code is configured to be executed by the at least one processor to provide a result of the query.

BRIEF DESCRIPTION OF THE DRAWINGS

Generally, like reference numerals in the various figures are utilized to designate like components.

DETAILED DESCRIPTION

Present invention embodiments include methods, systems and computer program products for optimizing both ad hoc queries and known queries without human intervention and without any performance impact to queries in an OLTP context.

In various embodiments, when a threshold number of records of a most outer table of a NLJN operation have been performed by an access plan of a relational database management system, the access plan may be suspended. A filter factor of all of the local predicates of a query may be recalculated based on tuples that have already been accessed. In some embodiments, a sampling method that uses an index may provide a more accurate filter factor for each of the local predicates than a filter factor estimated by a query optimizer. A cost to complete the query using the current access plan and a cost of a new access plan may be determined. If the cost to complete the query using the current access plan is cheaper than the cost of a new access plan, then the current access plan is used to complete the query. Otherwise, if the cost of the new access plan is less than the cost to complete the current access plan, then the new access plan is used and the query is rerun. By switching to an access plan that is less costly for rerunning the query instead of completing the query with a current access plan, the query is performed more efficiently and in less time than the query with the current access plan, thereby providing a computational advantage over existing methods, systems and computer program products for performing a query.

Figure 1:
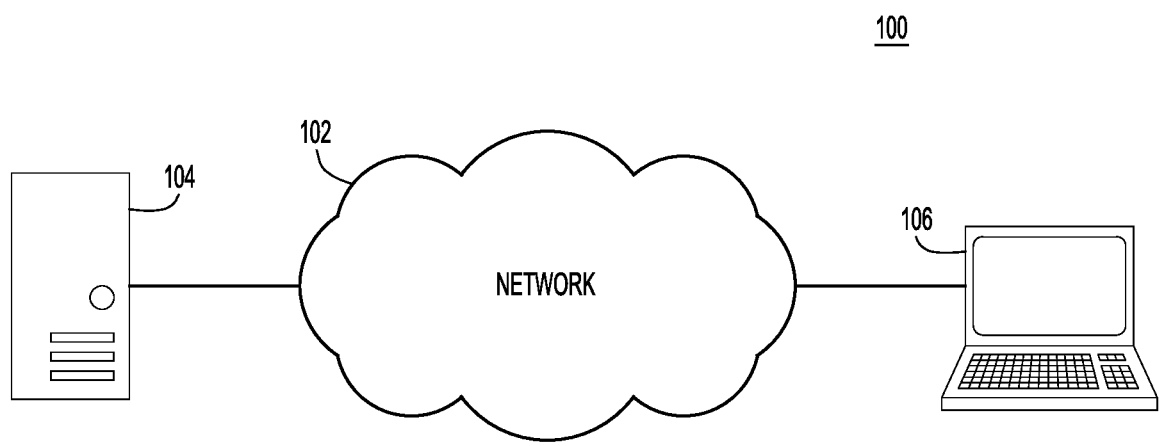
FIG. 1 illustrates an example environment in which various embodiments may be implemented.

FIG. 1 shows an example environment 100 in which various embodiments may be implemented. Example environment 100 may include a network 102, a computing system 104 and a user's computing system 106. Network 102 may include a local area network (LAN), a wide area network (WAN), a public switched data network (PSDN), the Internet, an intranet, other types of networks, or any combination of the above. Computing system 104 may have access to a relational database management system (not shown), which may be local or remote with respect to computing system 104. Further, in some embodiments, computing system 104 may include a server or a group of servers such as a server farm. Computing system 104 and user's computing system 106 may communicate with each other via network 102.

In a stand-alone environment, the relational database management system may be local to user's computing system 106. In such an environment, user's computing system 106 may or may not be connected to a network, such as network 102, and may not communicate with other computing systems such as computing system 104.

Figure 2:
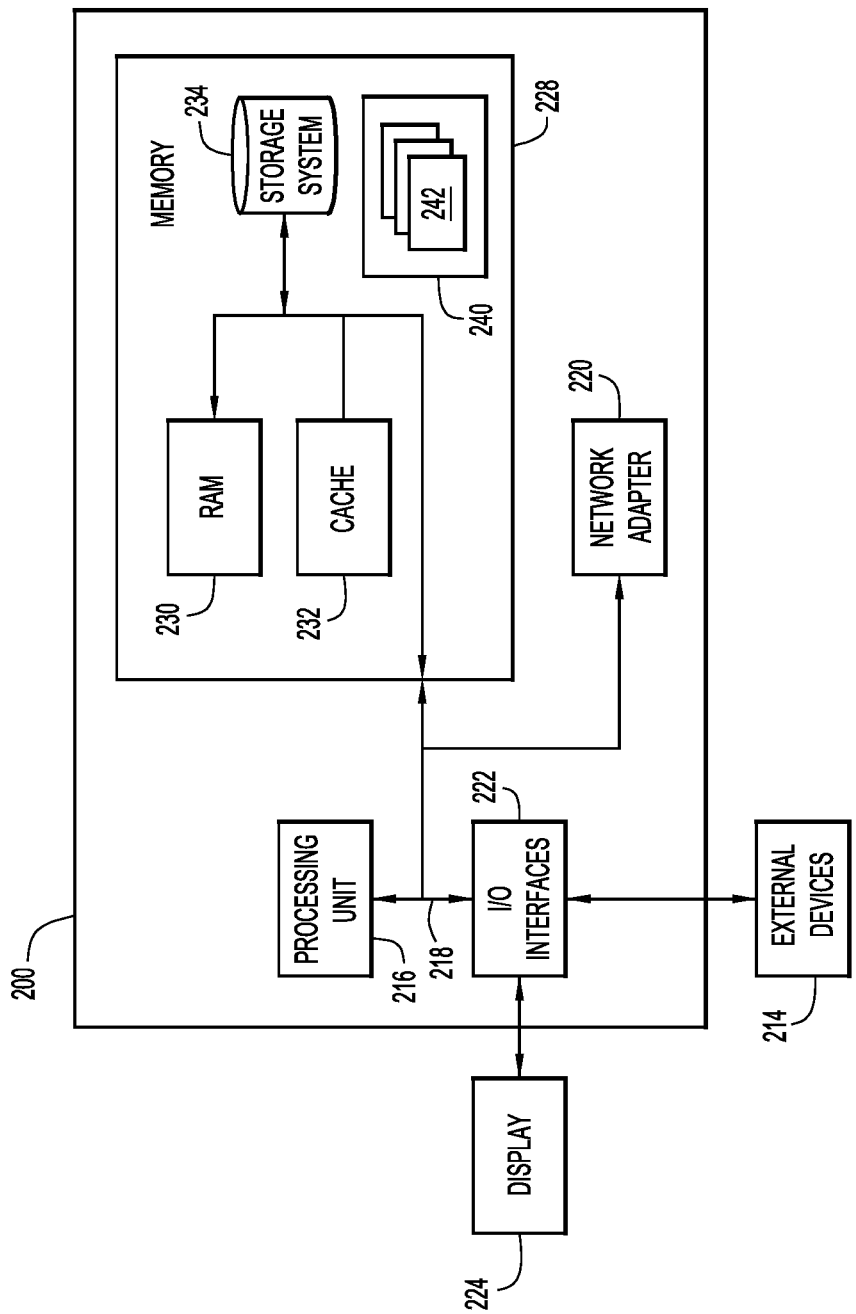
FIG. 2 is a functional block diagram of an example computing system that may implement various embodiments of the invention.

Computing system 104 and user's computing system 106 may each be implemented by computing system 200 shown in FIG. 2. FIG. 2 shows a functional block diagram of computing system 200. Computing system 200 is shown in a form of a general-purpose computing device. Components of computing system 200 may include, but are not limited to, one or more processors or processing units 216, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 typically includes a variety of computer system readable media. Such media may be any available media that is accessible by computing system 200, and includes both volatile and non-volatile media, removable and non-removable media.

System memory 228 can include computer system readable media in the form of volatile memory, such as random access memory (RAM) 230 and/or cache memory 232. Computing system 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computing system 200 may also communicate with one or more external devices 214 such as a keyboard, a pointing device, a display 224, etc.; one or more devices that enable a user to interact with computing system 200; and/or any devices (e.g., network card, modem, etc.) that enable computing system 200 to communicate with one or more other computing devices. Such communication can occur via Input/Output (I/O) interfaces 222. Still yet, computing system 200 can communicate with one or more networks such as a local area network (LAN), a general wide area network (WAN), and/or a public network (e.g., the Internet) via network adapter 220. As depicted, network adapter 220 communicates with the other components of computing system 200 via bus 218. It should be understood that, although not shown, other hardware and/or software components could be used in conjunction with computing system 200. Examples, include, but are not limited to: microcode, device drivers, redundant processing units, external disk drive arrays, RAID systems, tape drives, and data archival storage systems, etc.

Figure 3:
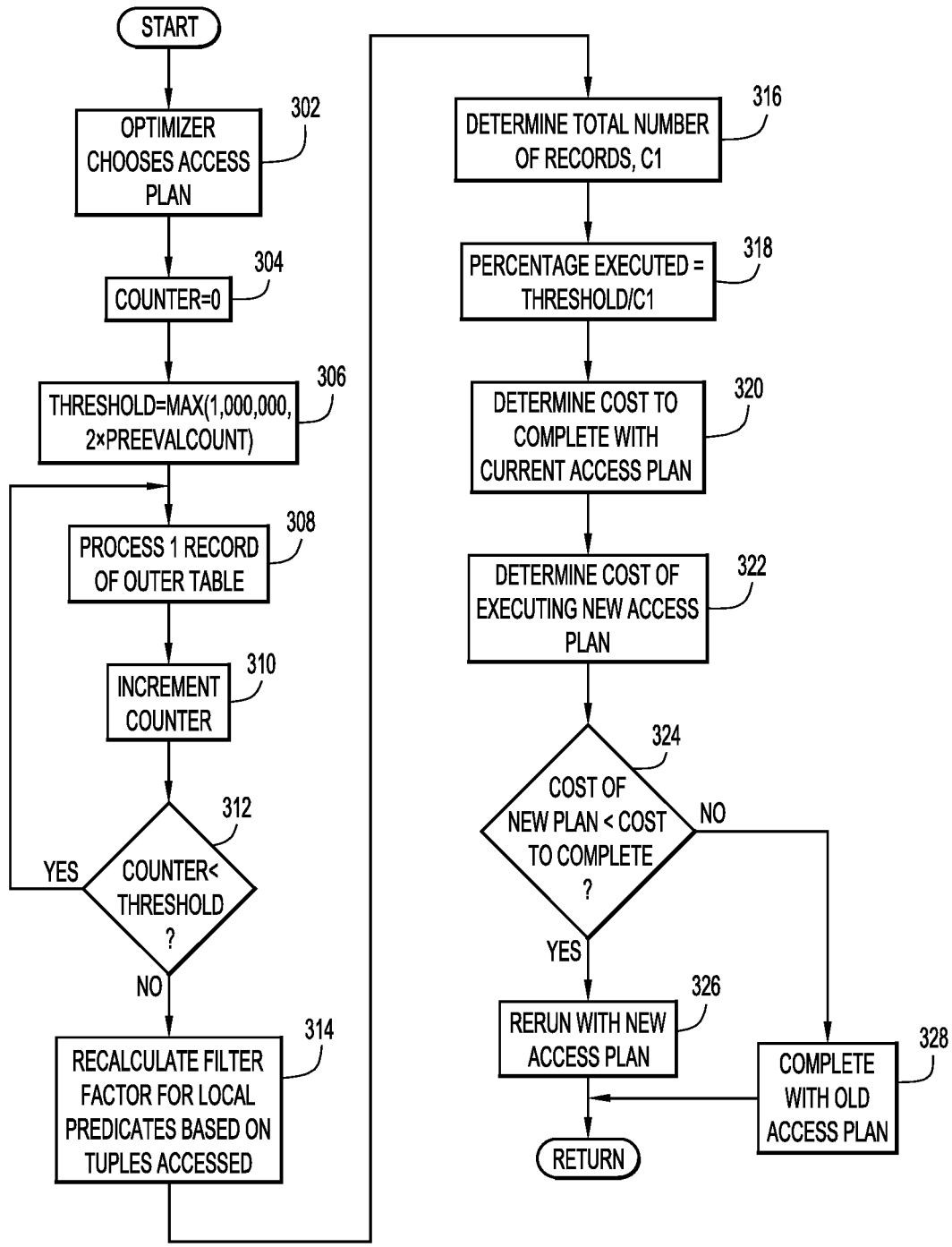
FIG. 3 is a flowchart that illustrates example processing, in some embodiments, with respect to evaluating whether a current access plan is an efficient access plan and changing access plans when the current access plan is determined not to be the efficient access plan.

FIG. 3 is a flowchart that illustrates example processing that may be performed by a computing system in various embodiments. The process may begin with a query optimizer of a relational database management system choosing an access plan (act 302). The query optimizer may calculate a filter factor of 0.04 by default for each local predicate, when in fact, the filter factor may be more than 0.99 for each of the local predicates. As a result, the query optimizer may choose to include a NLJN operation in an access plan.

Figure 4:
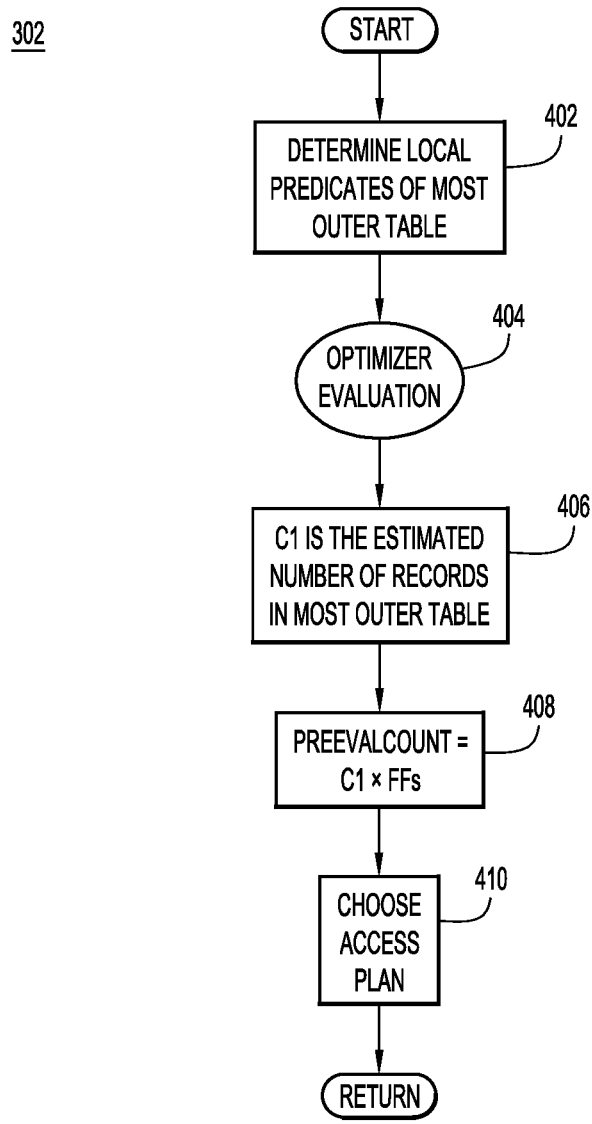
FIG. 4 is a flowchart that illustrates example processing with respect to a query optimizer choosing an access plan in embodiments of the invention.

FIG. 4 is a flowchart that helps to explain how the query optimizer chooses an access plan (act 302; FIG. 3). The process may begin with the local optimizer determining local predicates of a most outer table of a nested loop join (act 402). Next, the query optimizer may evaluate the local predicates to determine a filter factor for each of the local predicates (act 404) and may provide C1, which is an estimated total number of records in a most outer table of a NLJN operation (act 406). The computing system may then calculate preEvalCount, which is the estimated number of records in the most outer table multiplied by the filter factor of each of the local predicates of the most outer table (act 408). Thus, if the determined filter factor of each of the local predicates is much lower than an actual filter factor, then preEvalCount would be much lower than the actual number of records of the most outer table that would be processed. The query optimizer may then select an access plan based on the value of preEvalCount (act 410). Generally, when prerequisites for a Hash JOIN operation and a Merge JOIN operation are not satisfied, such as when a join operation of two tables would result in a small number of tuples, the query optimizer selects a NLJN operation to include in the access plan.

Returning to FIG. 3, a counter for counting the number of records processed of the most outer table of the NLJN operation may be initialized to zero (act 304). A threshold value may be set to a larger value of an empirical value such as, for example, 1,000,000 or another value, and twice the value of preEvalCount (act 306). As each record of the most outer table that satisfies local predicates of the most outer table is processed, the counter is incremented (acts 308, 310 and 312). After processing each respective row of the most outer table, the counter is compared with the threshold value to determine whether the counter is not less than the threshold value (act 312). When the counter is not less than the threshold value, then the filter factors of the local predicates are considered to be inaccurate, the current access plan is suspended, and filter factors for all local predicates of each table may be recalculated (act 314). In some embodiments, the recalculated filter factors may be stored for use with future similar query optimizations.

In some embodiments, the filter factor for each of the local predicates of each of the tables may be recalculated by using a sampling method with an index. One sampling method that may be used is row-level Bernoulli sampling, which obtains a sample of P % of the table rows by using a SARGable predicate that includes each row in the sample with a probability of P/100 and excludes each row in the sample with a probability of 1−P/100.

Next, a percentage of records of the most outer table that have been processed may be determined by determining a total number of records, C1, of the most outer table, which in some embodiments may be determined by the query optimizer (act 316), and dividing the threshold value by C1 (act 318).

Once the percentage of records processed from the most outer table is known, a cost to complete the query with the current access plan may be determined using the recalculated filter factors of all of the local predicates (act 320). Thus, for example, if the percentage of records processed of the most outer table is 10%, the cost of the current access method may be determined using the more accurate recalculated filter factors. Multiplying the cost of the current access method by (1−p), where p is the percentage of records processed of the most outer table, provides the cost to complete the query using the current access method.

Next, a new access plan may be selected based on using the recalculated filter factors and a cost of executing the new access plan may be determined (act 322). The cost of the new access plan may be compared with the cost to complete the current access plan (act 324). If the cost of executing the new access plan is less than the cost to complete the current access plan, then the query may be rerun with the new access plan (act 326). Otherwise, the query may be completed using the current, or old, access plan (act 328).

The environment of the present invention embodiments may include any number of computers or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A machine-implemented method to optimize an access plan, which includes a nested loop join, for a query in a relational database management system, the method comprising:

executing, by a computing system, a nested loop join access plan selected by a query optimizer for a query, the executing including counting a number of records processed from records of a most outer table of the nested loop join that satisfy local predicates of the most outer table;

when the number of records processed from the most outer table is not less than a threshold value, performing:

suspending, by the computing system, execution of the nested loop join access plan, while the execution of the nested loop join access plan is suspended, performing, by the computing system:

recalculating filter factors for local predicates based on tuples accessed, determining a cost to complete the query with the nested loop join access plan using the recalculated filter factors, selecting a new access plan based on using the recalculated filter factors, determining a cost of executing the new access plan, and comparing the cost to complete the query using the nested loop join access plan with the cost of executing the new access plan based on the recalculated filter factors for the local predicates of the query;

when the determined cost of executing the new access plan to complete is less than the determined cost to complete the query with the nested loop join access plan, executing, by the computing system, the new access plan while rerunning the query; and when the determined cost of executing the new access plan is not less than the determined cost to complete the query with the nested loop join access plan, resuming execution, by the computing system, of the nested loop join access plan to complete running the query; and providing, by the computing system, a result of the query, wherein:

the determining the cost to complete the query with the nested loop join access plan comprises:

multiplying a total number of records of the most outer table by the recalculated filter factors to obtain a total number of records of the most outer table that satisfy the local predicates, dividing the threshold value by the total number of records of the most outer loop table that satisfy the local predicates to obtain a percentage, p, of the total number of records of the most outer loop table that satisfy the local predicates and have been processed, and multiplying a cost of executing the nested loop join access plan by (1−p) to produce the cost to complete the query with the nested loop join access plan.

2. The machine-implemented method of claim 1, further comprising:

setting the threshold value to be a larger value selected from an empirical value and twice an estimated number of the most outer table records that satisfy the local predicates of the most outer table.

3. The machine-implemented method of claim 1, wherein the recalculating the filter factors for the local predicates based on the tuples accessed further comprises:

recalculating the filter factors for each of the local predicates of the query by sampling the accessed tuples using an index.

4. The machine-implemented method of claim 1, further comprising storing the recalculated filter factors for future similar query optimizations.

5. A system to optimize an access plan, which includes a nested loop join, for a query in a relational database management system, the system comprising:

at least one processor; and at least one memory connected with the at least one processor, the at least one processor being configured to perform:

executing a nested loop join access plan selected by a query optimizer for a query, the executing including counting a number of records processed from records of a most outer table of the nested loop join that satisfy local predicates of the most outer table;

when the number of records processed from the most outer table is not less than a threshold value, performing:

suspending execution of the nested loop join access plan, while the execution of the nested loop join access plan is suspended, performing:

recalculating filter factors for local predicates based on tuples accessed, determining a cost to complete the query with the nested loop join access plan using the recalculated filter factors, selecting a new access plan based on using the recalculated filter factors, determining a cost of executing the new access plan, and comparing the cost to complete the query using the nested loop join access plan with the cost of executing the new access plan based on the recalculated filter factors for the local predicates of the query;

when the determined cost of executing the new access plan is less than the determined cost to complete the query with the nested loop join access plan, executing, by the computing system, the new access plan while rerunning the query; and when the determined cost of executing the new access plan is not less than the determined cost to complete the query with the nested loop join access plan, resuming execution of the nested loop join access plan to complete running the query; and providing a result of the query, wherein:

the determining the cost to complete the query with the nested loop join access plan comprises:

multiplying a total number of records of the most outer table by the recalculated filter factors to obtain a total number of records of the most outer table that satisfy the local predicates, dividing the threshold value by the total number of records of the most outer loop table that satisfy the local predicates to obtain a percentage, p, of the total number of records of the most outer loop table that satisfy the local predicates and have been processed, and multiplying a cost of executing the nested loop join access by (1−p) to produce the cost to complete the query with the nested loop join access plan.

6. The system of claim 5, wherein the at least one processor is further configured to perform:

setting the threshold value to be a larger value selected from an empirical value and twice an estimated number of the most outer table records that satisfy the local predicates of the most outer table.

7. The system of claim 5, wherein the recalculating the filter factors for the local predicates based on the tuples accessed further comprises:

recalculating the filter factors for each of the local predicates of the query by sampling accessed tuples using an index.

8. The system of claim 5, wherein the at least one processor is further configured to perform storing of the recalculated filter factors for future similar query optimizations.

9. A computer program product comprising:

at least one computer readable storage medium having computer readable program code embodied therewith for execution on at least one processor, the computer readable program code being configured to be executed by the at least one processor to perform:

executing a nested loop join access plan selected by a query optimizer for a query, the executing including counting a number of records processed from records of a most outer table of the nested loop join that satisfy local predicates of the most outer table;

when the number of records processed from the most outer table is not less than a threshold value, performing:

suspending execution of the nested loop join access plan, while the execution of the nested loop join access plan is suspended, performing:

recalculating filter factors for local predicates based on tuples accessed, determining a cost to complete the query with the nested loop join access plan using the recalculated filter factors, selecting a new access plan based on using the recalculated filter factors, determining a cost of executing the new access plan, and comparing the cost to complete the query using the nested loop join access plan with the cost of executing the new access plan based on the recalculated filter factors for the local predicates of the query;

when the determined cost of executing the new access plan is less than the determined cost to complete the query with the nested loop join access plan, executing the new access plan while rerunning the query; and when the determined cost of executing the new access plan is not less than the determined cost to complete the query with the nested loop join access plan, resuming execution of the nested loop join access plan to complete running the query; and providing a result of the query, wherein:

the determining the cost to complete the query with the nested loop join access plan comprises:

multiplying a total number of records of the most outer table by the recalculated filter factors to obtain a total number of records of the most outer table that satisfy the local predicates, dividing the threshold value by the total number of records of the most outer loop table that satisfy the local predicates to obtain a percentage, p, of the total number of records of the most outer loop table that satisfy the local predicates and have been processed, and multiplying a cost of executing the nested loop join access by (1−p) to produce the cost to complete the query with the nested loop join access plan.

10. The computer program product of claim 9, wherein the computer readable program code is further configured to be executed by the at least one processor to perform:

setting the threshold value to be a larger value selected from an empirical value and twice an estimated number of the most outer table records that satisfy the local predicates of the most outer table.

11. The computer program product of claim 9, wherein the recalculating the filter factors for the local predicates based on the tuples accessed further comprises:

recalculating the filter factors for each of the local predicates of the query by sampling accessed tuples using an index.

12. The computer program product of claim 9, wherein the at least one processor is further configured to perform storing of the recalculated filter factors for future similar query optimizations.

* * * * *